June 18, 1935.  C. M. McLANAHAN  2,005,263
MOTOR VEHICLE DRIVE
Filed March 20, 1933   3 Sheets-Sheet 2
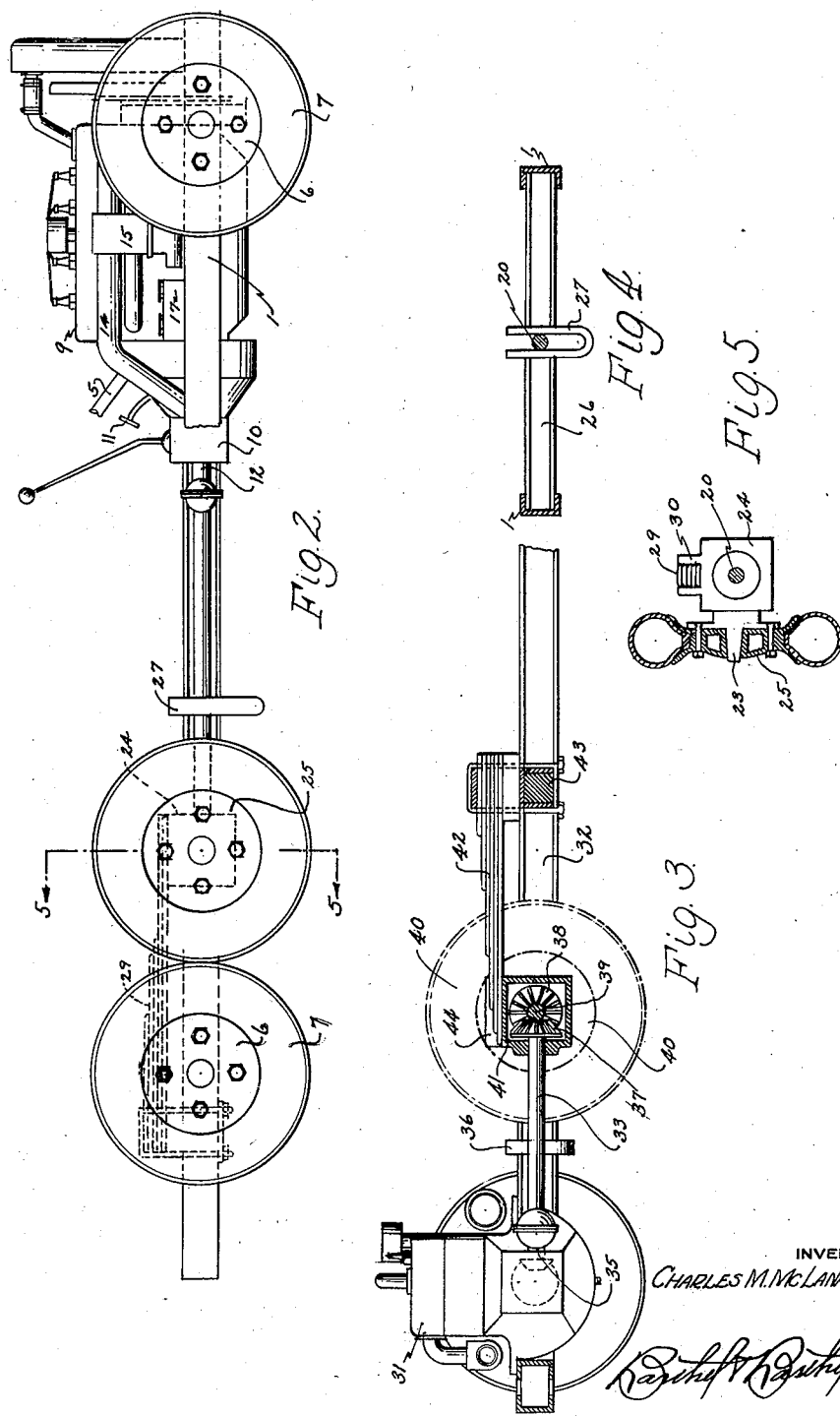
INVENTOR
CHARLES M. McLANAHAN.
ATTORNEYS June 18, 1935.　　C. M. McLANAHAN　　2,005,263
MOTOR VEHICLE DRIVE
Filed March 20, 1933　　3 Sheets-Sheet 3

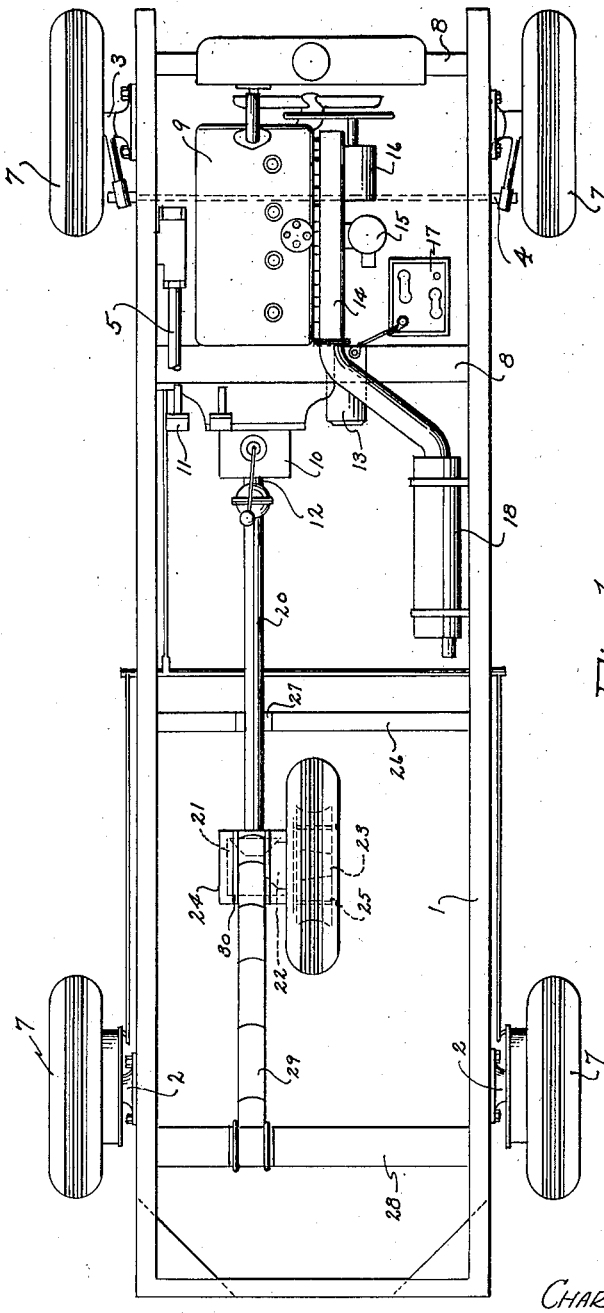

INVENTOR
CHARLES M. MC LANAHAN.
BY
ATTORNEYS

Patented June 18, 1935

2,005,263

UNITED STATES PATENT OFFICE 2,005,263

MOTOR VEHICLE DRIVE

Charles M. McLanahan, Detroit, Mich.

Application March 20, 1933, Serial No. 661,675

5 Claims. (Cl. 180—15)

The present invention relates to a novel driving mechanism of a type particularly adapted for automotive vehicles.

The primary object of the present invention is to provide a drive mechanism for automobiles and like vehicles, which utilizes power from the motor of the vehicle to propel the same, the driving mechanism being separate and independent of the rolling or supporting wheels ordinarily provided on automobiles and like vehicles.

Another object of the present invention is to provide a drive mechanism for automotive vehicles to be driven by the motor of the vehicle, to utilize the power thereof to propel the vehicle without the use of a differential gearing such as is ordinarily provided to prevent scuffing of the tires when the vehicle is not travelling in a straight line.

Another object of the present invention is to provide a drive mechanism for automotive vehicles wherein it is impossible to drive the supporting wheels at a speed greater than the speed required for a given rate of travel of the vehicle and thus cause skidding.

Still another object of the present invention is to provide a driving mechanism for automotive vehicles which operates independently of the vehicle supporting wheels, and which includes an auxiliary wheel, connected to and rotated and controlled by conventional automotive vehicle motor, power transmission, and clutch, and means for yieldably holding the wheel in contact with the supporting or road surface at a central point relative to the vehicle, to provide a centralized traction drive for the vehicle without the use of a differential gearing. By eliminating the necessity of a differential gearing driving traction under some circumstances is increased, an example being where a vehicle is being operated over a road having soft, muddy ruts, in which case slipping of one wheel, in a conventionally driven vehicle, destroys the traction of the remaining wheel when a differential gearing is employed. The present drive wheel, however, is supported at a central point so as to contact with the road surface at a point remote from the ruts that are formed in soft roads by the wheels of the vehicle that carry the weight thereof.

With the above and other ends in view, the invention consists in matters hereinafter set forth and more particularly pointed out in the appended claims, reference being had to the accompanying drawings, in which—

Figure 1 is a plan view of an automotive vehicle chassis, illustrating the present invention applied thereto;

Fig. 2 is a side elevation having parts broken away;

Fig. 3 illustrates, in vertical cross section, a reverse mounting of the driving motor;

Fig. 4 is a transverse cross section illustrating the propeller shaft guide;

Fig. 5 is a cross section taken on the line 5—5 of Fig. 2, and

Like characters of reference are employed throughout to designate corresponding parts.

Figure 6:
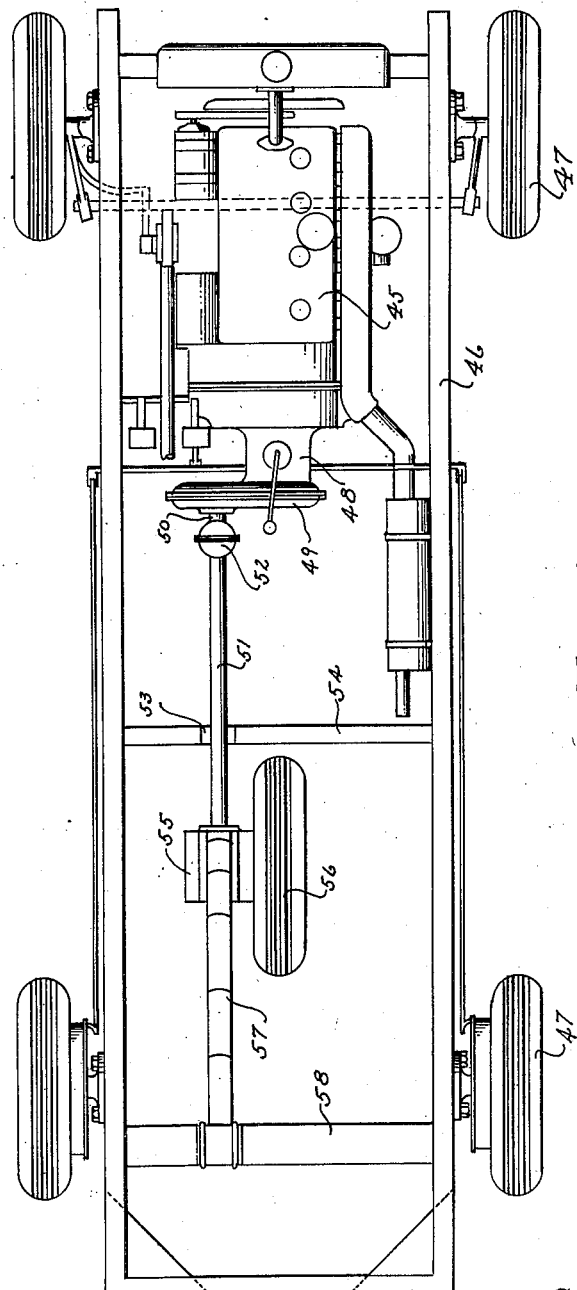
Fig. 6 is a plan view of an automotive vehicle chassis, illustrating another mode of driving the present drive mechanism.

The numeral 1 designates the chassis or frame of a motor vehicle upon which are directly mounted a pair of co-axially aligned stub axles 2, on opposite sides and adjacent one end of the frame. Adjacent the opposite end of the frame are mounted axle spindles 3, upon pivoting knuckles or any other conventional dirigible wheel support, to be moved pivotally for steering purposes by a cross rod 4 that is actuated by a column 5 upon the upper end of which a conventional steering wheel (not shown) is mounted. Upon the spindles 2 and 3 are mounted wheels 6 that carry low pressure tires 7.

Adjacent the forward end of the frame 1 are mounted cross members 8 that support an internal combustion engine 9 equipped with a change torque transmission 10 and a clutch control pedal 11. Both the transmission and clutch mechanisms are well known in the automotive industry and inasmuch as the particular transmission and clutch form no special part of the invention, the construction is not shown in detail.

For the purpose of an understanding of the present invention it will be understood that the shaft 12 may be controlled by the clutch and transmission in the usual manner.

The engine 9, transmission 10, and shaft 12 are mounted so that the center line thereof is offset as compared to the center line of the frame, and to compensate for this uneven distribution of weight the starting motor 13, exhaust manifold 14, carburetor 15, generator 16, battery 17, and exhaust muffler 18 are all mounted on the other side of the center line of the frame. Connected to the shaft 12, through a universal joint 19 is a propeller shaft 20 which extends towards the rear of the frame on one side of the center line thereof. The propeller shaft 20 terminates in front of the rear wheels 7 and is provided with a bevelled gear 21 on its end to mesh with a bevelled gear 22 on a stub axle spindle 23, the gears 21 and 22 and the stub axle spindle 23 being enclosed and supported in a casing 24. The stub axle spindle has a wheel 25 keyed thereto, to rotate therewith. To prevent side sway of the propeller shaft 20 there is provided a cross frame member 26 with a U-shaped guide 27 that permits pivotal movement of the propeller shaft relative to the frame in a vertical plane only.

Adjacent the rear of the frame 1 is provided a cross member 28 upon which is secured a leaf spring 29 whose outer end is slidably received in guides 30 on the casing 24, the spring being constructed to exert pressure on the casing tending to force the same downwardly and thus hold the wheel 25 yieldingly in contact with the road or other supporting surface.

In operation the shaft 20 is rotated by the motor 9, the speed and operation being controlled by clutch 11 and transmission 10. Rotation of the propeller shaft 20 rotates gears 21 and 22 and the stub axle spindle 23 and thus causes rotation of the wheel 25. Inasmuch as the wheel 25 is held in contact with the road or supporting surface by the spring 29 rotation of the wheel 25 causes the vehicle to roll on wheels 6 in a direction and speed corresponding to the direction and speed of rotation of the propeller shaft 20.

The wheel 25 is supported by the casing so that it contacts with the road at a point intermediate the sides of the vehicle and is driven directly from the propeller shaft, without the use of a differential gear due to the fact that there is a single traction wheel, and without the use of gears to offset the propeller shaft 20 such as would be necessary if the engine 9 were mounted in the center of the frame, in order to have the wheel 25 contact with the road at a point exactly half way between the sides of the frame.

In the embodiment illustrated in Figure 3 there is shown an engine 31 mounted at the rear of a frame 32 with a propeller shaft 33 connected by a universal joint 34 to a shaft 35 driven thereby and guided so that it may pivot on said universal joint in a vertical plane only by a U-shaped guide 36. On the forward end of the shaft 33 is a bevelled gear 37 that meshes with a bevelled gear 38 on a stub axle spindle 39 that carries a wheel 40, the gears and axle spindle being supported in a casing 41. A spring 42 is supported on a cross frame member 43 so that its end projects between guides 44 on the casing 41 to urge the same downwardly and yieldingly hold the wheel 25 in contact with the ground surface. With the operation of the first described form in mind detailed description of the operation of the last described form is not essential inasmuch as the location and manner of driving the wheel 25 is the same as described in reference to wheel 6.

In Figure 6 there is illustrated a modified form of the present invention wherein the motor 45 is centrally mounted relative to a frame 46 upon which wheels 47 are mounted, the wheels adjacent the forward end of the frame being dirigible type. The motor is equipped with a conventional transmission 48 upon which is mounted a gear box 49 that encloses gearing for rotating a shaft 50 that is supported thereby in a plane offset from the center of the frame. To the shaft 50 is connected a propeller shaft 51 through a universal joint 52, the propeller shaft being restricted to pivotal movement on said universal in a vertical plane only by guides 53 supported on a cross frame member 54. A gear casing 55 receives the end of the propeller shaft 51 and supports a wheel 56 in the manner described above in reference to both above described embodiments, so that rotation of the propeller shaft causes rotation of the wheel. The wheel 56 is yieldingly held in contact with the ground by a spring 57 supported by a cross frame member 58.

Although specific embodiments of the present invention have been illustrated and described it is to be understood that various changes may be made in the details of construction without departing from the spirit of the invention as set forth in the appended claims, and such changes are contemplated.

What I claim is:—

1. The combination with a frame supported upon wheels, of an engine carried by said frame, a propeller shaft, means for connecting said propeller shaft to said engine, drive members mounted on the free end of said propeller shaft, a wheel carried by said drive members, guide means mounted in said frame and receiving said propeller shaft for preventing side sway of said propeller shaft, said means being located remote from said drive members and remote from said wheel and means for holding said wheel in contact with a road surface, said last named means being arranged to engage said drive members remote from said wheel.

2. An automotive vehicle comprising a frame supported upon wheels, an engine supported by said frame, a drive shaft adapted to be driven by said engine, a propeller shaft having a universal connection with said drive shaft, a gear housing supported upon the outer end of said propeller shaft, gearing in said housing and driven by said propeller shaft, a traction wheel rotatably supported by said housing and connected with said gearing, a rigid cross member in said frame, and a spring having one end secured to said cross member and having its other end in sliding engagement with said housing.

3. An automotive vehicle comprising a frame supported upon wheels, an engine supported by said frame, a drive shaft adapted to be driven by said engine, a propeller shaft having a universal connection with said drive shaft, a gear housing supported upon the outer end of said propeller shaft, gearing in said housing and driven by said propeller shaft, a traction wheel rotatably supported by said housing and connected with said gearing, a rigid cross member in said frame, a spring having one end secured to said cross member and having its other end in sliding engagement with said housing, and a U-shaped element rigidly mounted in said frame and adapted to engage said propeller shaft at a point between the universal connection and said housing to prevent lateral movement of said propeller shaft.

4. An automotive vehicle comprising a frame supported upon wheels, an engine supported by said frame, a drive shaft adapted to be driven by said engine, a propeller shaft having a universal connection with said drive shaft, a housing supported upon the outer end of said propeller shaft, a rotatable shaft extending through one side of said housing and geared to said propeller shaft, a traction wheel detachably mounted on the outer end of said shaft, a rigid cross member in said frame, a leaf spring having one end secured to said cross member, and guides on top of said housing slidably receiving the other end of said spring.

5. An automotive vehicle comprising a frame supported upon wheels, an engine supported by said frame, a drive shaft adapted to be driven by said engine, a propeller shaft having a universal connection with said drive shaft, a housing supported upon the outer end of said propeller shaft, a rotatable shaft extending through one side of said housing and geared to said propeller shaft, a traction wheel detachably mounted on the outer end of said shaft, a rigid cross member in said frame, a leaf spring having one end secured to said cross member, guides on top of said housing slidably receiving the other end of said spring, and a U-shaped element rigidly mounted in said frame and adapted to engage said propeller shaft at a point between the universal connection and said housing to prevent lateral movement of said propeller shaft.

CHARLES M. McLANAHAN.